United States Patent
Kokojima

(10) Patent No.: US 7,817,152 B2
(45) Date of Patent: Oct. 19, 2010

(54) IMAGE PROCESSING APPARATUS, IMAGE PROCESSING METHOD, AND IMAGE PROCESSING PROGRAM

(75) Inventor: Yoshiyuki Kokojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 354 days.

(21) Appl. No.: 11/535,277

(22) Filed: Sep. 26, 2006

(65) Prior Publication Data

US 2007/0211061 A1 Sep. 13, 2007

(30) Foreign Application Priority Data

Mar. 10, 2006 (JP) ............... 2006-066274

(51) Int. Cl.
*G06T 11/00* (2006.01)

(52) U.S. Cl. ............... 345/470; 345/423; 345/441; 345/442; 345/443; 345/467; 345/468; 345/469; 345/471; 345/472; 345/947

(58) Field of Classification Search ............... 345/469.1, 345/470, 441–443, 467–472
See application file for complete search history.

(56) References Cited

U.S. PATENT DOCUMENTS 7,239,319 B2 * 7/2007 Loop ............... 345/467
7,432,937 B2 * 10/2008 Poddar et al. ............... 345/592

FOREIGN PATENT DOCUMENTS

| JP | 62-256092 | 11/1987 |
|---|---|---|
| JP | 2001-109454 | 4/2001 |
| JP | 2002-260008 | 9/2002 |
| JP | 2003-91737 | 3/2003 |

OTHER PUBLICATIONS

Loop, Charles, and Jim Blinn. "Rendering Vector Art on the GPU." Ed. Hubert Nguyen. GPU Gems 3. Upper Saddle River [etc.]: Addison-Wesley, 2007. pp. 543-560.*
U.S. Appl. No. 11/686,673, filed Mar. 15, 2007, Kokojima.
U.S. Appl. No. 11/687,831, filed Mar. 19, 2007, Kokojima.
Charles Loop, et al., "Resolution Independent Curve Rendering using Programmable Graphics Hardware", 2005, 10 Pages.
M. Schneider, et al., "Real-Time Rendering of Complex Vector Data on 3d Terrain Models", Proceedings of the 11th International Conference on Virtual Systems and Multimedia, pp. 573-582.
Japanese Office Action dated May 11, 2010, Application No. 2006-066274, with English Translation, 8 pages.

* cited by examiner

*Primary Examiner*—Xiao M Wu
*Assistant Examiner*—Scott E Sonners
(74) *Attorney, Agent, or Firm*—Oblon, Spivak, McClelland, Maier & Neustadt, L.L.P.

(57) ABSTRACT

A image processing apparatus has a first data generation unit which generates triangular data by making straight line contours and curved contours triangles by analyzing the straight line contours and the curved contours with respect to vector format graphic data, a second data generation unit which generates stencil data from the triangular data, and a third data generation unit which generates raster format graphic data with reference to the stencil data.

8 Claims, 17 Drawing Sheets

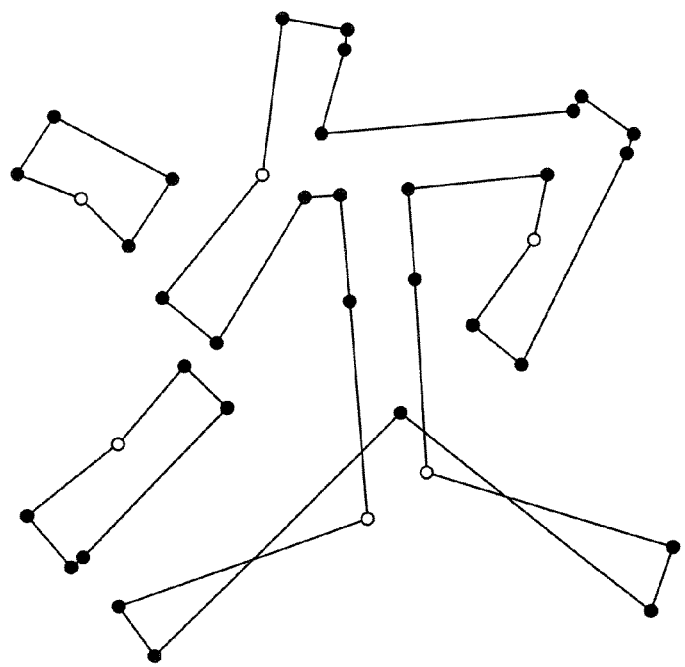
F I G. 5A
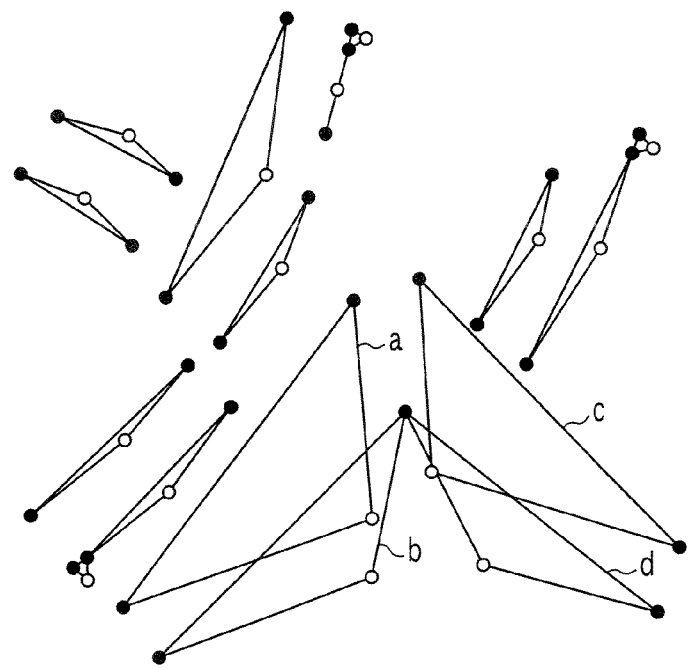
F I G. 5B
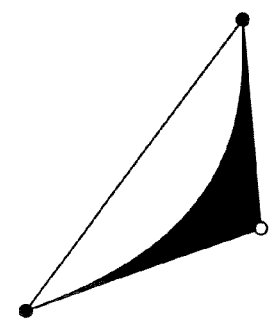
F I G. 6A
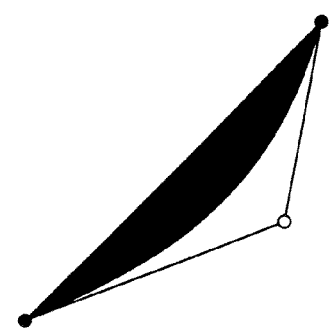
F I G. 6B

| Triangular point number generated from polygon P0 | Triangular point number generated from polygon P1 | Triangular point number generated from polygon P2 |
|---|---|---|
| 0 - 1 - 2 | 23 - 24 - 25 | 28 - 29 - 30 |
| 0 - 2 - 3 | 23 - 25 - 26 | 28 - 30 - 31 |
| 0 - 3 - 4 | 23 - 26 - 27 | |
| 0 - 4 - 5 | | |
| 0 - 5 - 6 | | |
| 0 - 6 - 7 | | |
| 0 - 7 - 8 | | |
| 0 - 8 - 9 | | |
| 0 - 9 - 10 | | |
| 0 - 10 - 11 | | |
| 0 - 11 - 12 | | |
| 0 - 12 - 13 | | |
| 0 - 13 - 14 | | |
| 0 - 14 - 15 | | |
| 0 - 15 - 16 | | |
| 0 - 16 - 17 | | |
| 0 - 17 - 18 | | |
| 0 - 18 - 19 | | |
| 0 - 19 - 20 | | |
| 0 - 20 - 21 | | |
| 0 - 21 - 22 | | |

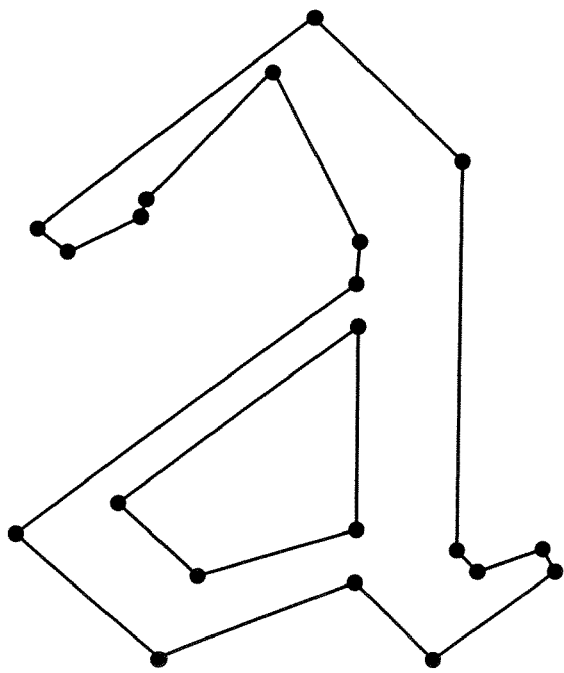 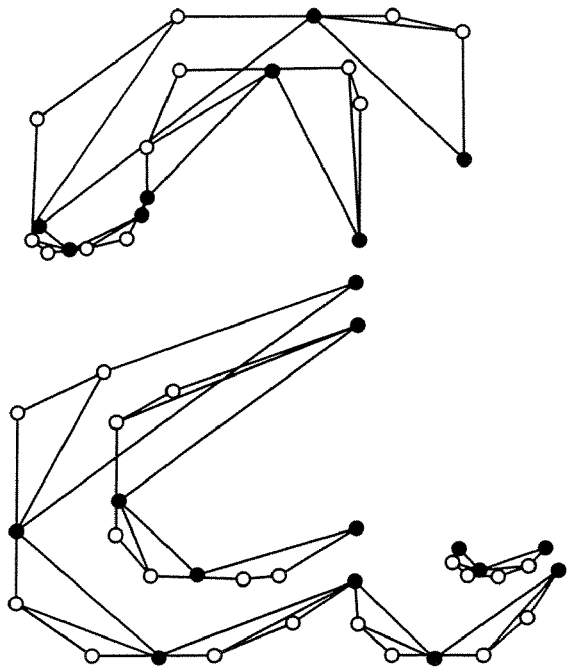
F I G. 25A    F I G. 25B
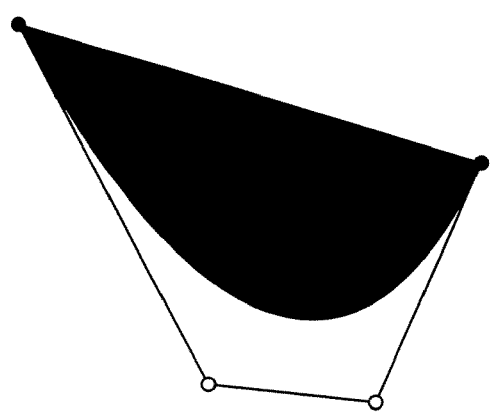 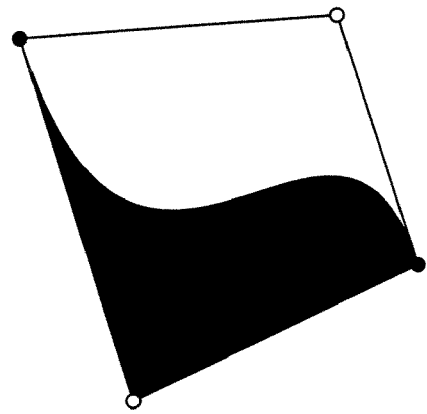
F I G. 26A    F I G. 26B

IMAGE PROCESSING APPARATUS, IMAGE PROCESSING METHOD, AND IMAGE PROCESSING PROGRAM

CROSS-REFERENCE TO RELATED APPLICATIONS

This application is based upon and claims the benefit of priority from prior Japanese Patent Application No. 2006-066274, filed Mar. 10, 2006, the entire contents of which are incorporated herein by reference.

BACKGROUND OF THE INVENTION

1. Field of the Invention

The present invention relates to a drawing technology for generating raster format graphic data from vector format graphic data.

2. Description of the Background Art

Images configured by combining geometric graphics primitives such as points, straight lines, curves, rectangles, and ellipses are called vector graphics. On the other hand, images configured by arrays of points (pixels or dots) are called raster graphics.

Generally, images which are displayed on displays or are printed by printers are raster graphics. Therefore, when vector graphics are handled by these devices, processing for transforming those into raster graphics (i.e., rasterizing) is required. The processing cost of rasterizing is high, and a high-performance computer is required for rasterizing complicated vector graphics.

On the other hand, because proper-resolution raster graphics can be generated every time vector graphics are displayed, there is no case in which the image qualities of contours and the like are deteriorated due to enlargement, reduction, and deformation of images. For this reason, artificial images such as illustrations and drawings, whose contours are clear, are handled as vector graphics in many cases. Natural images such as photographs are handled as raster graphics in many cases.

As the most familiar example of the utility of vector graphics, fonts have been known. In early personal computers (hereinafter referred to as "PC"), raster format fonts (bitmap fonts) have been used due to the restrictions on the CPU performances. However, in bitmap fonts, it is necessary to store font data at each resolution, and thus, a large quantity of storage capacity is required.

In accordance with improvement in subsequent CPU performances, current PCs can display high-quality fonts with a less storage capacity in such a manner that vector format font (outline font) data independent of resolution are stored in advance, and fonts at appropriate resolution corresponding to a display or a printer are generated in each case.

However, CPUs built into mobile telephones, car navigation systems, or the like have relatively low processing capacities. Hence, there has been an object that arithmetic costs required for rasterizing vector graphics are reduced.

In recent years, graphics processing units (GPUs) have been used in order to achieve the above object. In a rasterizing technique using the GPU, a curve is approximated by using a plurality of triangles. For this reason, when raster graphics are enlarged, the raster graphics have the rough looks. Because it is necessary to improve the approximate accuracy of a curve by using a large number of triangles in order to smoothly rasterize vector graphics, the increases in the storage capacity and the processing cost are inevitable. Here, a technique for rasterizing vector graphics by using, for example, a GPU has been proposed (Reference Document: C. Loop and J. Blinn, Resolution Independent Curve Rendering using Programmable Graphics Hardware, refer to SIGGRAPH 2005). The processing of the rasterizing technique in the reference document includes two-staged processing of preprocessing by a CPU, and main processing by the GPU.

In the rasterizing technique in this reference document, vector graphics are processed, not in units of triangles, but in units of pixels near to a curve. As a consequence, the curve can be always smoothly rasterized independently of resolution. In addition thereto, the storage capacity and the processing cost are independent of resolution, and thus, there is no need to increase the storage capacity and the processing cost.

However, there are the following two problems in the rasterizing technique in the above-described reference document.

(1) The cost of preprocessing is high. The cost of preprocessing does not become a critical problem unless a geometrical form of a graphic changes in time. This is because there is no need to execute the preprocessing again after preprocessing is once performed. However, when a geometrical form of a graphic changes dynamically, the preprocessing must be performed again in each case, and therefore, the preprocessing will be a bottleneck in the entire rasterizing processing in many cases.

(2) Alpha blending is used for anti-aliasing. The "anti-aliasing" is processing for removing jaggy (step-like aliasing) appearing on a contour of a rasterized graphic. The "alpha blending" is processing for blending two pixel values translucently by using a coefficient called an alpha value.

As is widely known, in order to use alpha blending, all graphics objects must be sorted by a depth value (depth-sorted), and rasterized in order of graphic at a deeper position. The depth sorting is processing at an extremely high cost, and may be a bottleneck of the entire rasterizing processing in many cases.

BRIEF SUMMARY OF THE INVENTION

A image processing apparatus according to an aspect of the present invention is characterized by comprising: a first data generation unit which generates triangular data by making straight line contours and curved contours triangles by analyzing the straight line contours and the curved contours with respect to vector format graphic data; a second data generation unit which generates stencil data from the triangular data; and a third data generation unit which generates raster format graphic data with reference to the stencil data. Note that the present invention can be realized as, not only the apparatus invention as described above, but also a method or program invention.

BRIEF DESCRIPTION OF THE SEVERAL VIEWS OF THE DRAWING

FIGS. 5A and 5B are views showing examples of straight line contours and curved contours;

FIGS. 6A and 6B are views showing examples of a convex curved contour and a concave curved contour;

FIGS. 25A and 25B are views showing examples of convex curved contours and concave curved contours in the fourth embodiment;

FIGS. 26A and 26B are views showing examples of curved contours in cubic Bezier curves;

DETAILED DESCRIPTION OF THE INVENTION

Embodiments will be described with reference to the drawings.

Figure 1:
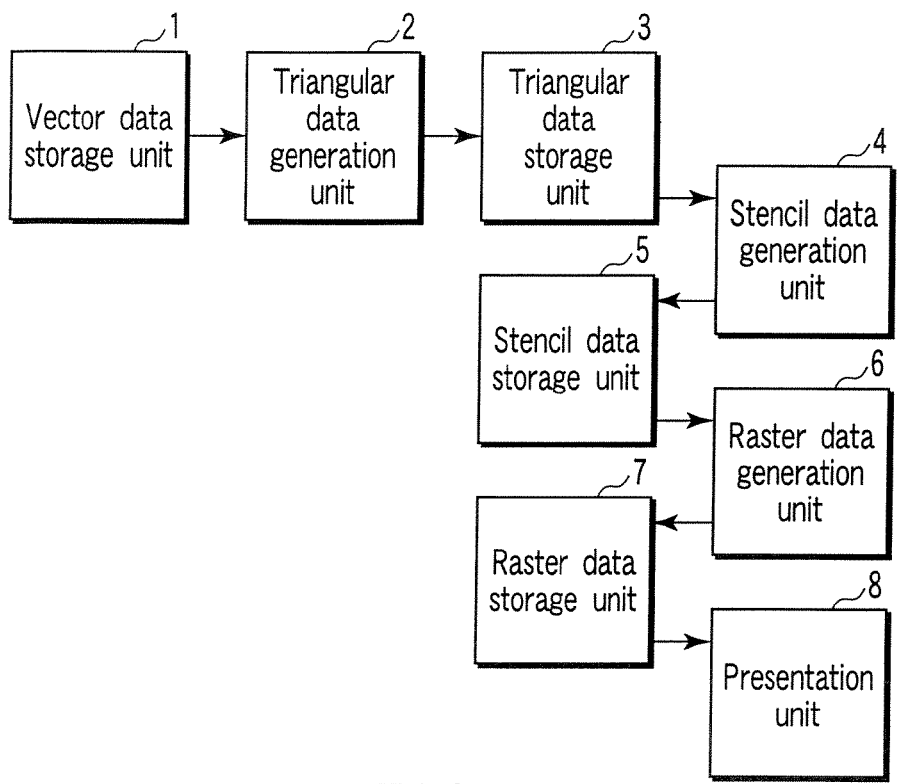
FIG. 1 is a block diagram showing a schematic configuration of a image processing apparatus according to a first embodiment.

In a first embodiment, processing of only convex curves in rasterizing for eliminating the use of preprocessing will be described. As shown in FIG. 1, a image processing apparatus has a vector data storage unit 1, a triangular data generation unit 2, a triangular data storage unit 3, a stencil data generation unit 4, a stencil data storage unit 5, a raster data generation unit 6, a raster data storage unit 7, and a presentation unit 8. A flow of data with respect to the respective blocks as well is shown in FIG. 1.

In the above-described configuration, the vector data storage unit 1 stores vector format graphic data.

The triangular data generation unit 2 reads the vector format graphic data stored in the vector data storage unit 1, and generates triangular data as will be described later in detail.

The triangular data storage unit 3 stores the triangular data generated by the triangular data generation unit 2.

The stencil data generation unit 4 reads the triangular data stored in the triangular data storage unit 3, and generates stencil data.

The stencil data storage unit 5 stores the stencil data generated by the stencil data generation unit 4.

The raster data generation unit 6 generates raster format data (hereinafter also referred to as "raster data") with reference to the stencil data stored in the stencil data storage unit 5.

The raster data storage unit 7 stores the raster data generated by the raster data generation unit 6.

The presentation unit 8 presents the raster data stored in the raster data storage unit 7.

In FIG. 1, the vector data storage unit 1, the triangular data storage unit 3, the stencil data storage unit 5, and the raster data storage unit 7 are described as different blocks. These storage units may be configured on a single memory, or may be configured separately on a plurality of different memories.

Figure 2:
FIG. 2 is a view showing one example of a vector format graphic.

A case in which vector graphics as shown in FIG. 2 are rasterized into raster graphics will be described. In this case, to facilitate understanding of explanation of the rasterizing technique of the present embodiment, first, the main point of the rasterizing technique described in the above-described reference document will be described.

Figure 3:
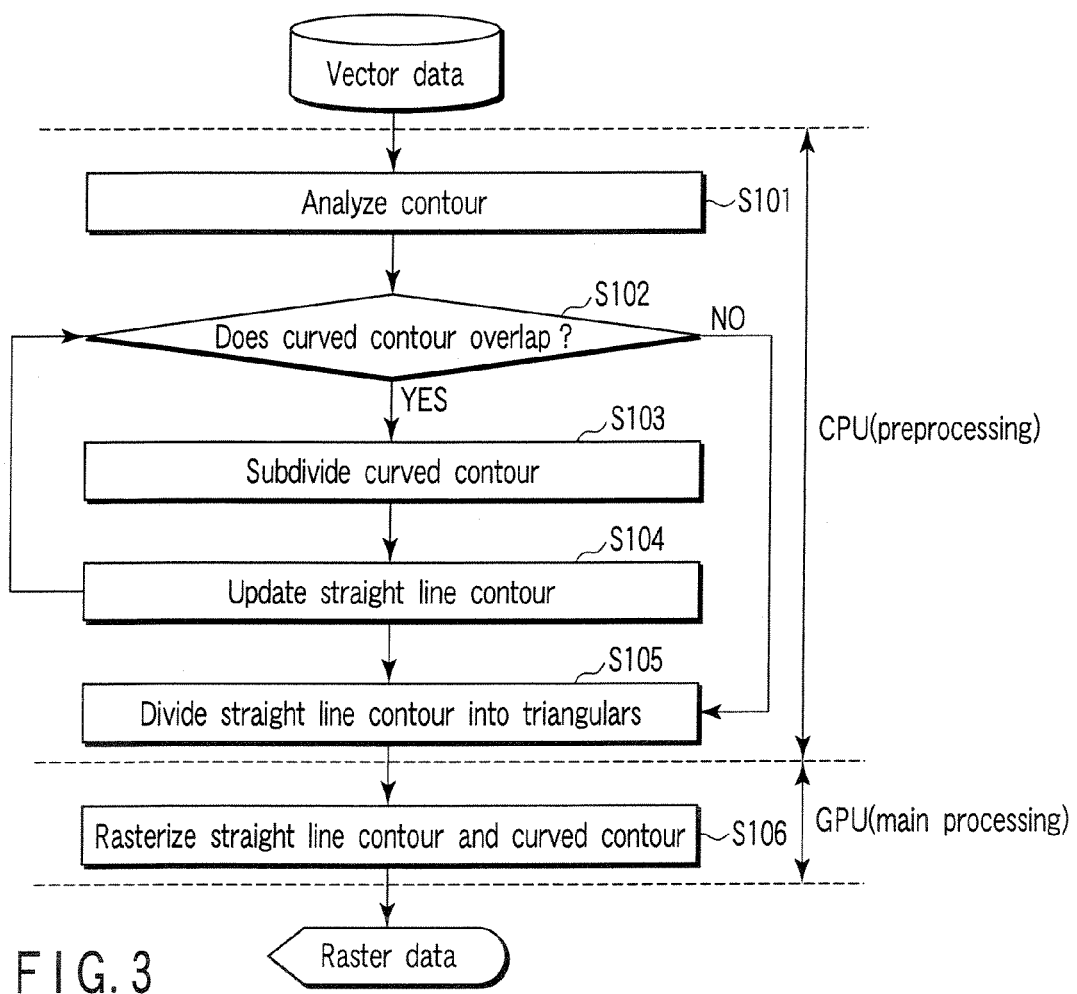
FIG. 3 is a flowchart showing a process flow of the rasterizing technique described in the reference document.

As can be seen from FIG. 3, the processing described in the reference document includes broadly two-staged processing of preprocessing by a CPU and main processing by a GPU. Namely, a vector format graphic is first decomposed into an assembly of triangles by the CPU. Thereafter, the respective triangles are rasterized by the GPU. The reason for this is that a unit of processing of the GPU is a triangle and the GPU cannot directly handle a graphic configured by straight lines and curves as shown in FIG. 2.

Figure 4:
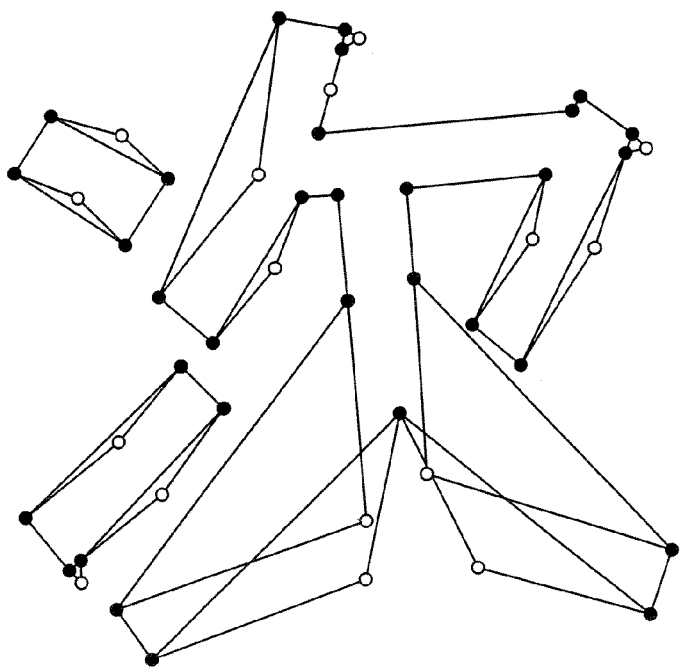
FIG. 4 is a view showing one example of vector data.

Specifically, first, vector format data (hereinafter also referred to as "vector data") is read from a storage medium such as an HDD or a RAM, and processing for analyzing the contours thereof is performed (step S101). For example, the vector format data expressing the graphic of FIG. 2 are configured by points and straight lines as shown in FIG. 4. In FIG. 4, end-points of the straight lines or the parameter curves of the graphic are expressed by black points, and control points of the parameter curves are expressed by white points. In step S101, two types of contour data as shown in FIGS. 5A and 5B are generated by analyzing such vector format data. The contour data of FIG. 5A is called "straight line contour", and the contour data of FIG. 5B is called "curved contour".

First, the curved contour of FIG. 5B will be described. As can be seen from FIGS. 2, 4 and 5B, the curved contour is an assembly of triangles connecting three points of starting points, ending points, and control points of the parameter curves. Here, the respective triangles circumscribe the parameter curves, and there are curves necessarily inside the triangles. Here, the curved contours are classified into two types of curved contours as shown in FIGS. 6A and 6B. In FIG. 6A, a concave area of the curve is at the inside of the graphic (hereinafter referred to as "concave curved contour"), and in FIG. 6B, a convex area of the curve is at the inside of the graphic (hereinafter referred to as "convex curved contour").

The straight line contours of FIG. 5A will be described. As can be seen from FIGS. 2, 4 and 5A, the straight line contours are polygons obtained by connecting the starting points and the ending points of the straight lines, the starting points and the ending points of the convex curved contours, and the starting points, the control points, and the ending points of the concave curved contours with line segments. Two points of a starting point and an ending point are connected on a convex curved contour while three points of a starting point, a control point, and an ending point are connected on a concave curved contour. Note that, as can be seen from FIG. 5A, polygons configuring the straight line contours are not necessarily limited to one (in this example, the straight line contours are configured by three polygons). Further, in some cases, the respective polygons may include self-intersections or holes.

Next, when the analysis on the contours of the vector format data is completed in step S101, it is examined whether or not there is overlapping on a generated curved contour (step S102). As a result, when overlapping is found, the routine proceeds to step S103 where processing is performed for subdividing a triangle whose area is larger between the overlapped two triangles (step S103). Because the straight line contours are changed under the influence of this subdividing processing, the straight line contours are updated (step S104). Thereafter, the routine returns to step S102 where it is examined again whether or not there is overlapping, and when there is no overlapping, the routine returns to step S105. Note that the processes in step S102 to S104 are repeated until no more overlaps exist.

Figure 7A:
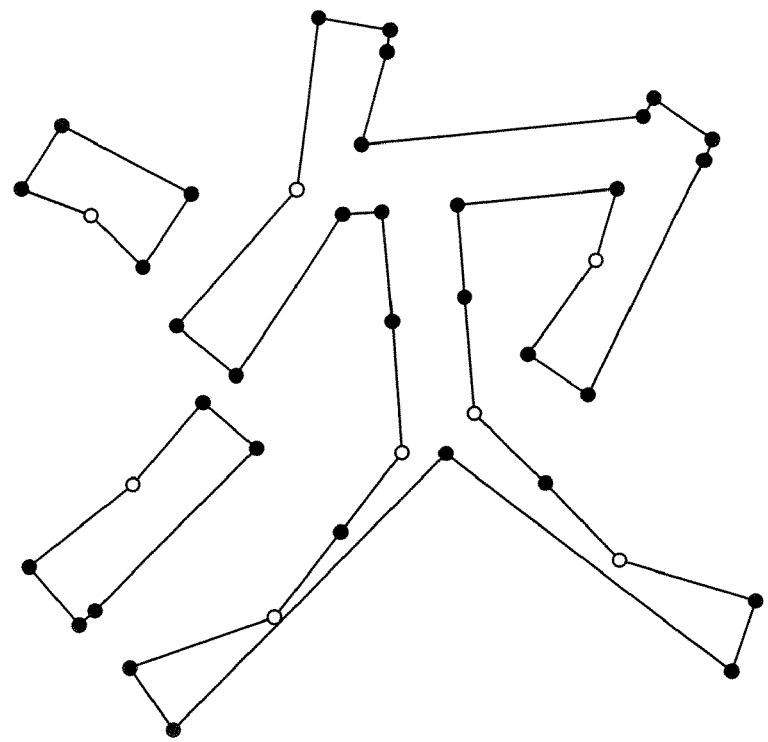
FIGS. 7A and 7B are views showing examples of the subdivided curved contours and the straight line contours updated in accordance with the subdivision.
Figure 7B:
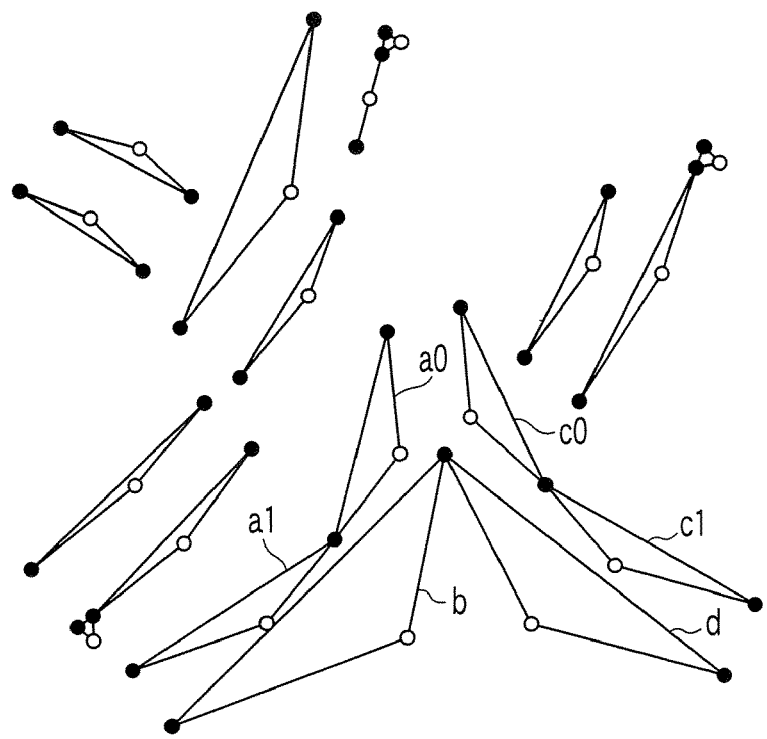

Specifically, for example, in a case of the curved contours of FIG. 5B, triangles a and b, and triangles c and d are overlapped. Therefore, the triangles a and c are respectively subdivided into two triangles a0 and b1, and c0 and c1 as shown in FIG. 7B. Then, the straight line contours are updated as shown in FIG. 7A.

Figure 8:
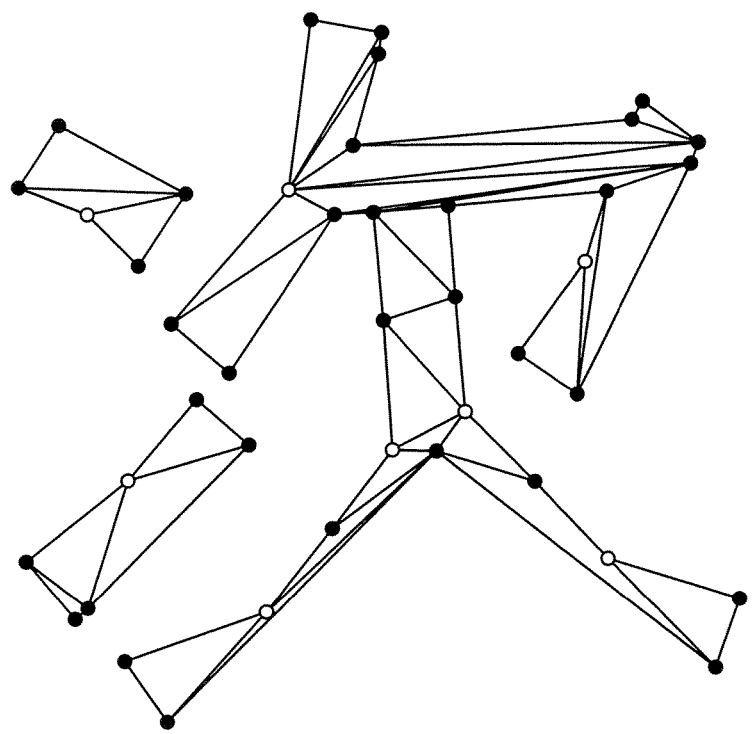
FIG. 8 is a view showing an example of the straight line contours divided into triangular data.

Next, the polygons configuring the straight line contours are respectively divided into a plurality of triangles. For example, the three polygons of FIG. 7A are divided into assemblies of triangles as shown in FIG. 8.

All the processes in the above-described steps S101 to S105 are executed as preprocessing by the CPU.

Figure 9A:
FIGS. 9A and 9B are views showing examples of the straight line contours and the curved contours which have been rasterized.
Figure 9B:
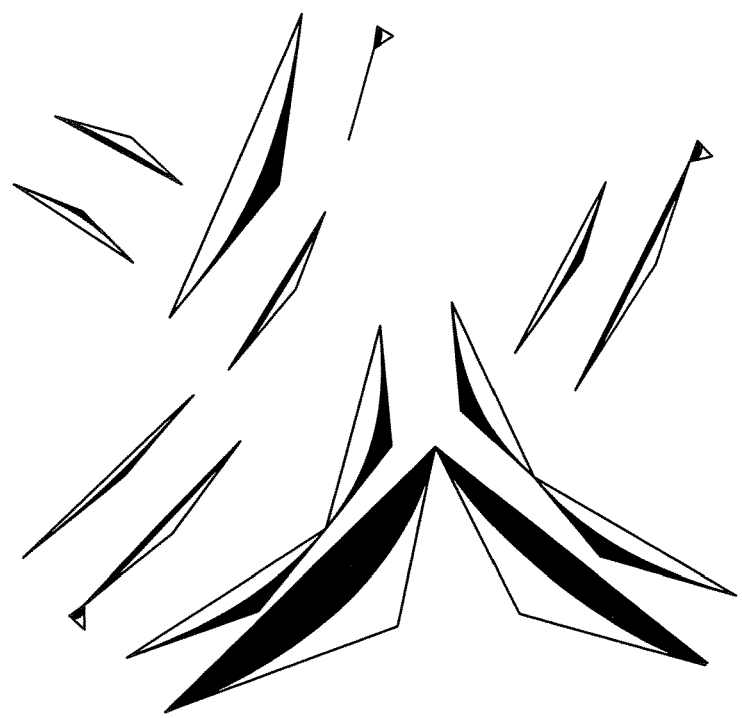

Then, the triangles configuring the straight line contours (FIG. 8) and the triangles configuring the curved contours (FIG. 7B) are rasterized by the GPU (step S106). At this time, as shown in FIG. 9A, all the pixels at the inside of the triangles configuring the straight line contours are rasterized. In contrast thereto, as shown in FIG. 9B, only the concave areas on the concave curved contours or only the convex areas on the convex curved contours are rasterized among the pixels at the inside of the triangles configuring the curved contours.

Figure 10:
FIG. 10 is a view showing an example of generated raster data.

The results of rasterizing of the straight line contours and the curved contours obtained as described above are stored together in a frame buffer inside the GPU. For example, the data shown in FIGS. 9A and 9B are respectively stored in the frame buffer as raster data as shown in FIG. 10.

In the present embodiment, there is the feature that the preprocessing by the CPU is reduced. Hereinafter, the detailed operations (processes) at the respective blocks of the image processing apparatus and the structure of the data flowing among the blocks will be described with reference to the drawings.

The vector data storage unit 1 stores vector data of a graphic to be rasterized. As described in FIG. 4, the vector data is composed of types of graphics primitives, coordinates of respective points configuring the graphics primitives, connecting relationship among the points, and the like.

For example, the vector data of the graphic of FIG. 2 is expressed as shown in FIG. 4 in the same manner as in the description described above. In FIG. 4, the end-points of the straight lines or the parameter lines are expressed by black points, and the control points of the parameter curves are expressed by white points.

In the first embodiment, suppose that the vector data as shown in FIG. 4 has been already stored in the vector data storage unit 1. The vector data is not limited to the format described above, and may include other data generally utilized in the field of computer graphics.

Figure 11:
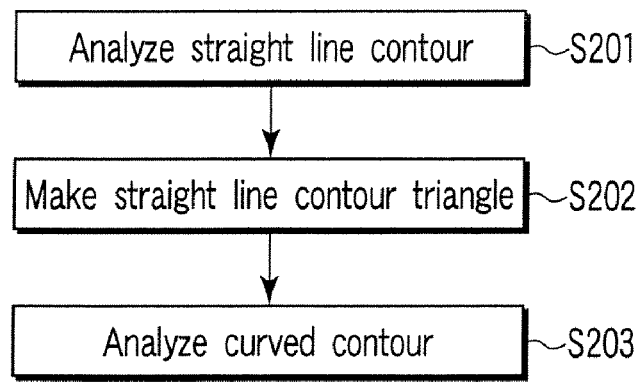
FIG. 11 is a flowchart showing a procedure of processes of a triangular data generation unit 2 in the first embodiment.

The vector data (FIG. 4) stored in the vector data storage unit 1 is read by the triangular data generation unit 2. The triangular data generation unit 2 generates triangular data in accordance with a flow as shown in FIG. 11 by analyzing the contours of the read vector data.

First, the straight line contours of the vector data are analyzed. In the technique shown in FIG. 5A, polygons obtained by connecting the starting points and the ending points included in the vector data, the starting points and the ending points of the convex curved contours, and the starting points, the control points, and the ending points of the concave curved contours with line segments are defined as straight line contours.

In contrast thereto, in the triangular data generation unit 2 in the first embodiment, at least one polygon is defined as a straight line contour. The at least one polygon is obtained by connecting only the starting points and ending points of the straight lines and curves included in the vector data with line segments, and disregarding the control points. For example, as straight line contours analyzed from the vector data of FIG. 4, three polygons P0, P1 and P2 as shown in FIG. 12 can be obtained (hereinafter, this will be described supposing that a plurality of polygons are obtained).

Next, making the straight line contour triangles is performed (step S202). Specifically, first, an arbitrary vertex among the plurality of vertices of the respective polygons configuring the straight line contours obtained in step S201 is selected (in this specification, this point is referred to as "pivot"). Then, with respect to each polygon, a plurality of triangles with the pivot being as one vertex are generated such that the pivot and all the other vertices on the polygon including the pivot are connected with straight lines, and two vertices coupled to each other become a side of one triangle. Where the two vertices coupled to each other mean two vertices connected with a side of a polygon.

Figure 12:
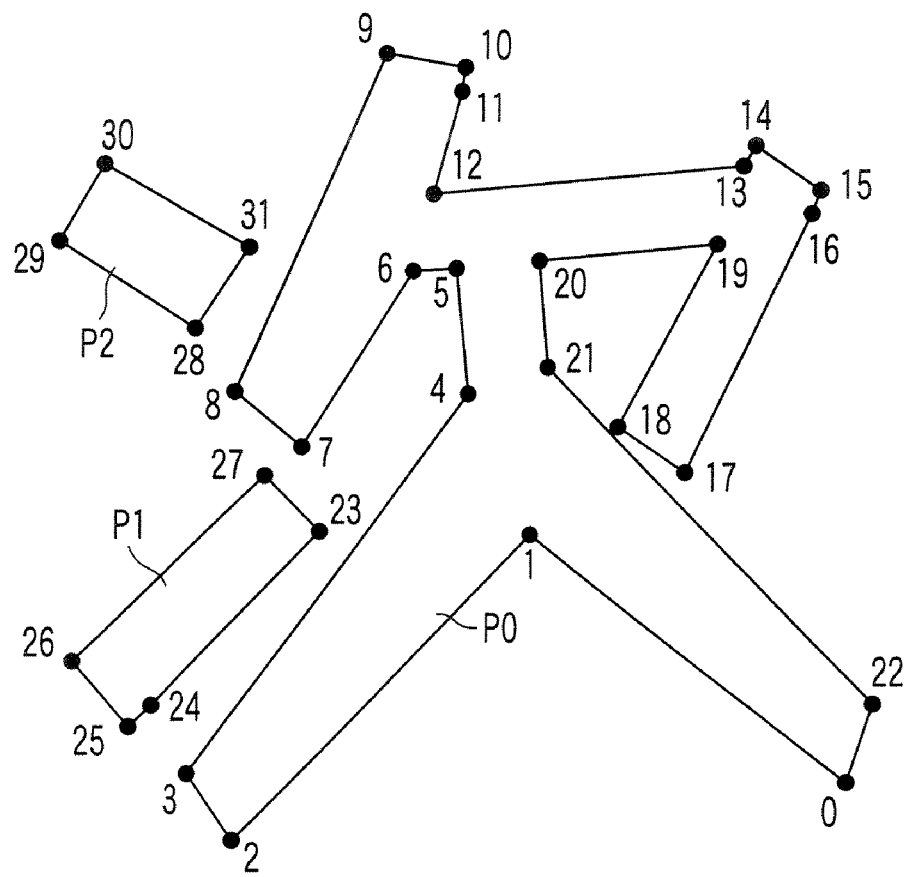
FIG. 12 is a view showing an example of the straight line contours in the first embodiment.
Figures 13, 14:
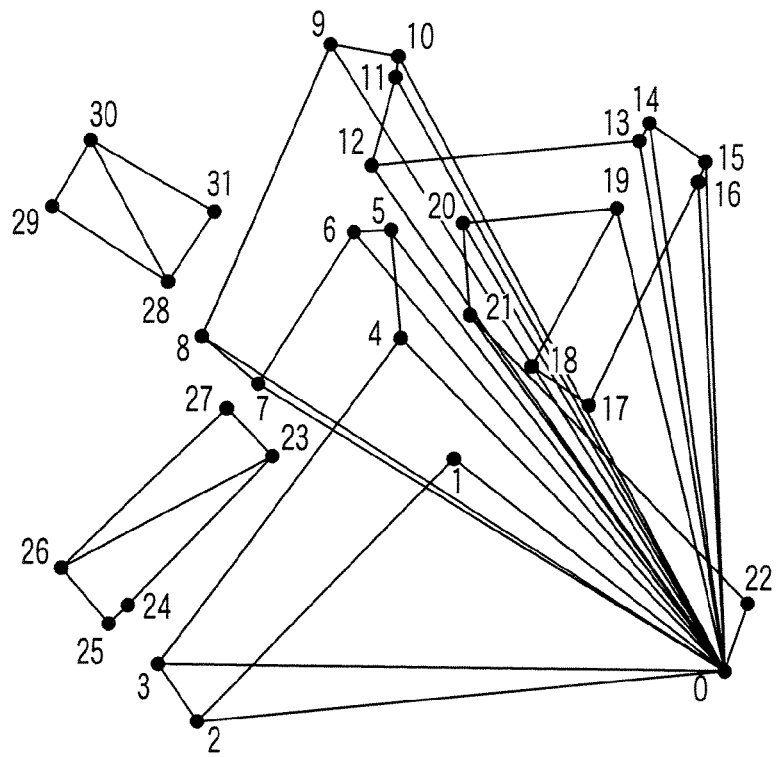
FIG. 13 is a view showing an example of triangular data generated from the straight line contours in the first embodiment.
FIG. 14 shows an example of triangular point numbers generated from the straight line contours in the first embodiment.

For example, assuming that, in FIG. 12, points 0, 23 and 28 are respectively selected as pivots for the three polygons P0, P1 and P2, a plurality of triangles as shown in FIG. 13 are generated. In FIG. 13, a plurality of triangles are overlapped on one another, and it is difficult to understand the forms of the triangles only from this drawing. Therefore, for convenience, numbers of the three vertices configuring the plurality of triangles generated from the three polygons P0, P1 and P2 are shown in FIG. 14.

However, FIG. 14 is merely a supplement to make the description understandable, and does not express the triangular data themselves. The actual triangular data are composed of position coordinates of three points, texture coordinates, connecting relationships, and the like configuring the respective triangles.

Then, the curved contours of the vector data are analyzed (step S203). In this processing, in the same manner as the processing shown in FIG. 5B, an assembly of triangles connecting three points of the starting points, the ending points, and the control points of the parameter curves included in the vector data is defined as a curved contour.

The triangular data (FIG. 13) of the straight line contours and the triangular data (FIG. 5B) of the curved contours which have been generated in accordance with the processing procedure as described above are output from the triangular data generation unit 2 and is stored in the triangular data storage unit 3.

Note that the procedure may be configured such that the processes of the above steps S201 and S202 are performed in parallel, so that triangles may be generated at the same time of analyzing straight line contours.

As described above, the triangular data are composed of position coordinates of three points, texture coordinates, connecting relationships, and the like configuring the respective triangles. However, the configuration of the triangular data is not limited to this format, and may include other data generally utilized in the field of computer graphics.

The stencil data generation unit 4 reads the triangular data stored in the triangular data storage unit 3, and generates stencil data by rasterizing pixels in the triangles.

The stencil data is image data having the same resolution as that finally presented to the presentation unit 8. Note that the stencil data is stored in the stencil data storage unit 5. Further, numeric values represented by a plurality of bits are assigned to the respective pixels of the stencil data, and those are initialized to 0 in advance of all drawings every frame.

Then, the stencil data generation unit 4 reads and rasterizes the triangular data of the straight line contours (FIG. 13) and the triangular data of the curved contours (FIG. 5B) from the triangular data storage unit 3. At this time, all the pixels at the inside of the triangles of the straight line contours are rasterized. Here, the rasterizing is performed such that pixels values of the stencil data at the inside of the triangles are bit-inverted for each triangle with respect to all the triangles shown in FIG. 13.

Figure 15:
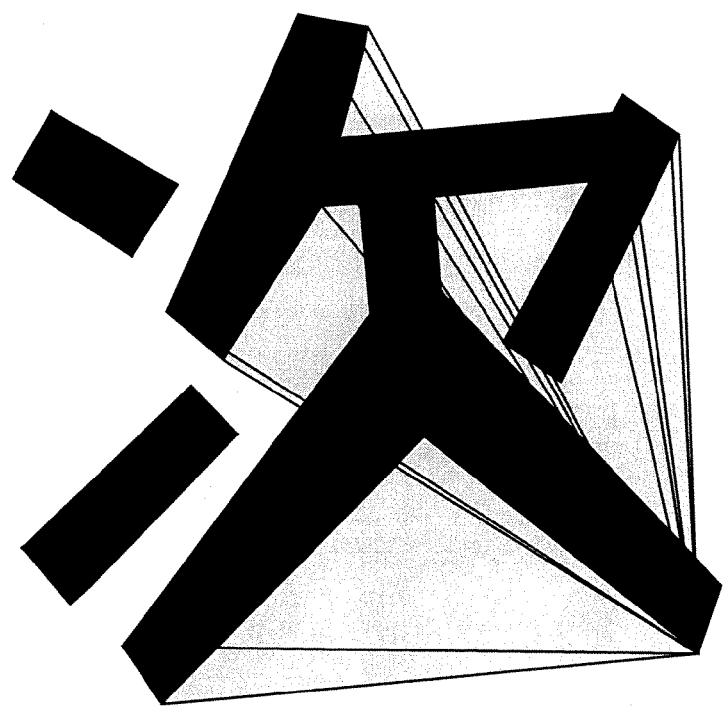
FIG. 15 is a view showing an example of generating triangular stencil data generated from the straight line contours in the first embodiment.

For example, when drawing all the triangles in FIG. 13 by bit-inversion, stencil data as shown in FIG. 15 is obtained. In FIG. 15, among the pixels subjected to the bit-inversion processing with respect to all the triangles, areas whose pixel values are numeric values other than zero are filled with black, and areas whose pixel values are zero are filled with gray. As can be seen from FIG. 15, the pixel values at the inside of the straight line contours are numeric values other than zero, and the pixel values at the outside are zero.

Among the pixels at the inside of the triangles of a curved contour, only pixels belonging to a convex area of a curve are rasterized, and pixel values of stencil data corresponding to these pixel positions are bit-inverted.

Figure 16A:
FIGS. 16A and 16B are views showing examples of generating triangular stencil data expressing the curved contours in the first embodiment.
Figure 16B:
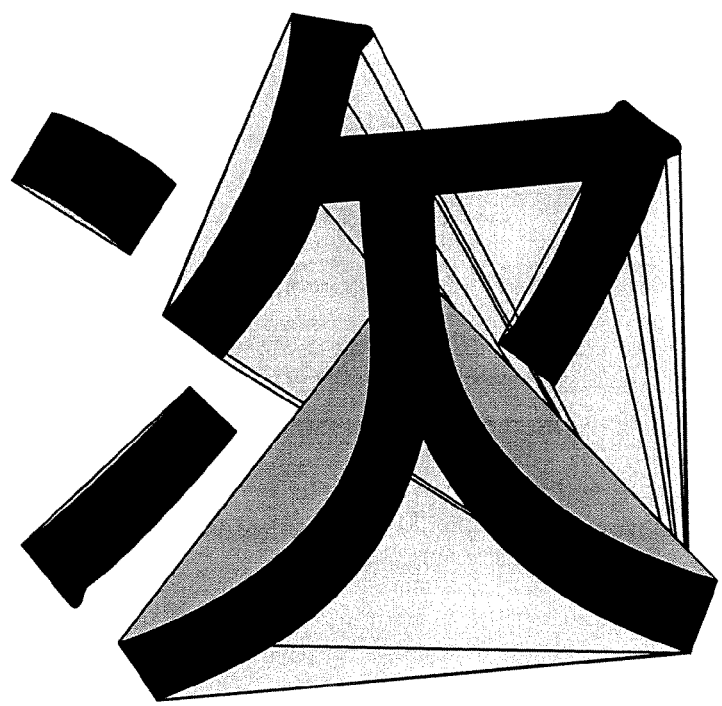

For example, when the rasterized stencil data as shown in FIG. 16A are applied to the stencil data as shown in FIG. 15 with respect to the triangles of the straight line contours, and pixel values belonging to the convex areas of the curves are bit-inverted, the stencil data are updated as shown in FIG. 16B. As can be seen from FIG. 16B, the pixel values at the inside of the graphic of FIG. 1 provided initially are numeric values other than zero, and the pixel values at the outside are zero.

There is no dependence on order in the processes of bit-inversion drawing of the triangular data. In FIGS. 15, 16A and 16B, first, the triangular data of the straight line contours are drawn in a lump, and then, the triangular data of the curved contours are drawn in a lump. However, all the triangles may be drawn in any order.

The stencil data storage unit 5 stores the stencil data (FIG. 16B) generated by the stencil data generation unit 4.

As described above, the stencil data is image data having the same resolution as that finally presented to the presentation unit 8. However, the configuration of the stencil data is not limited to this format, and may include other data generally utilized in the field of computer graphics.

The raster data generation unit 6 generates raster data such that only areas whose pixel values are numeric values other than zero (the areas filled with black in FIG. 16B) are rasterized with reference to the stencil data stored in the stencil data storage unit 5.

The raster data is image data having the same resolution as that finally presented to the presentation unit 8, and is stored in the raster data storage unit 7. Numeric values represented by a plurality of bits are assigned to the respective pixels of the raster data for each of a plurality of color components (for example, RGBA).

Figure 17A:
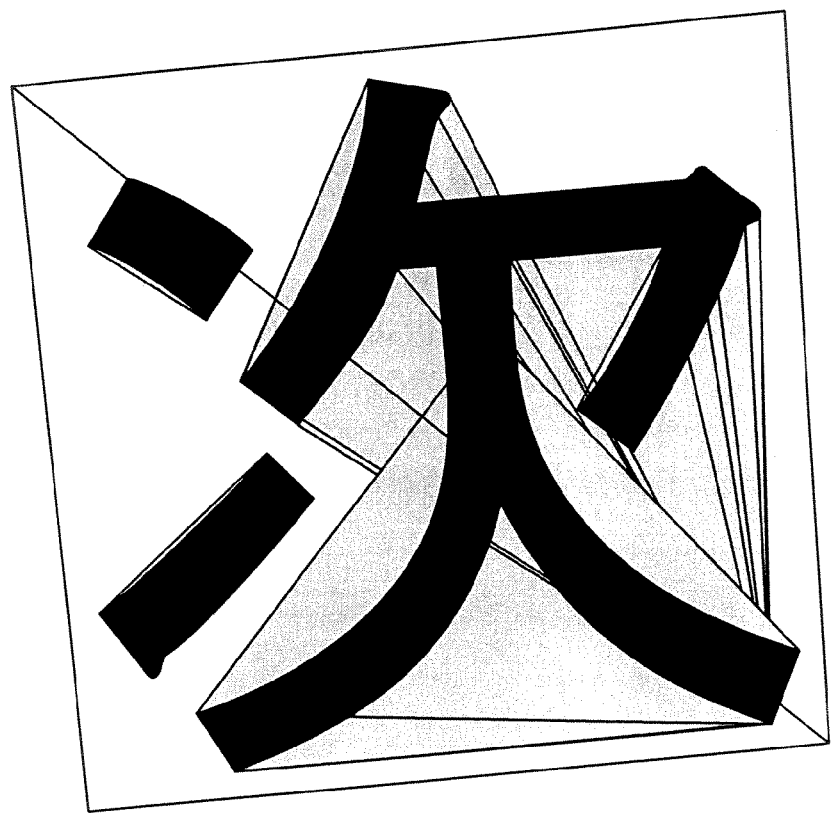
FIGS. 17A and 17B are views showing examples of generating raster data in the first embodiment.
Figure 17B:

As shown in FIG. 17A, the raster data generation unit 6 rasterizes all the pixels at the inside of the two triangles covering the entire graphics. However, pixels which will be actually written into the raster data storage unit 7 among these pixels are limited to areas at which pixel values of corresponding stencil data are numeric values other than zero (the areas filled with black in FIG. 17A). As a result, raster data as shown in FIG. 17B are written into the raster data storage unit 7.

As described above, the raster data is image data having the same resolution as that finally presented to the presentation unit 8. However, the configuration of the raster data is not limited to this format, and may include other data generally utilized in the field of computer graphics.

The presentation unit 8 is configured by a display, a printer, or the like for presenting the raster data stored in the raster data storage unit 7 to a user.

Figure 18:
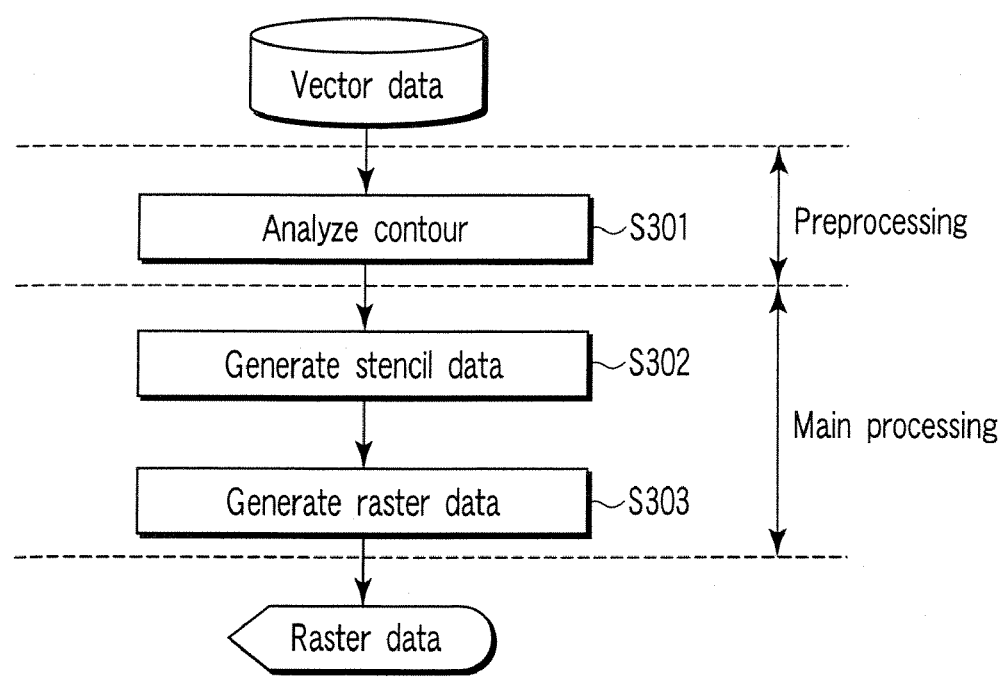
FIG. 18 is a flowchart showing a procedure of processing in the first embodiment.

A flowchart showing a procedure of processes of a rasterizing technique of FIG. 18 is compared with the flowchart shown in FIG. 3. According to the image processing apparatus of the first embodiment, the preprocessing cost by the CPU as shown in FIG. 3 is only for the analysis on contours (step S301). Then, the processes for generating stencil data (step S302) and generating raster data (step S303) are performed by the GPU. Therefore, it is possible to greatly reduce the preprocessing cost by the CPU. Accordingly, even when the geometrical form of the graphic is dynamically changed, rasterizing can be performed at high speed.

A second embodiment will be described.

Because a configuration of a image processing apparatus is the same as that in the first embodiment, illustrations and detailed descriptions thereof are omitted. The second embodiment is different from the first embodiment in that the processing contents of the triangular data generation unit 2 and the stencil data generation unit 4 are different.

As shown in FIG. 12, in the first embodiment, the triangular data generation unit 2 makes polygons, which are obtained by simply connecting the starting points and ending points of the straight lines and curves which are included in the vector data with line segments, be straight line contours.

In contrast thereto, in the second embodiment, in the same manner as the technique shown in FIG. 5A, the triangular data generation unit 2 makes polygons, which are obtained by connecting the starting points and the ending points of the straight lines, the starting points and the ending points of the convex curved contours, and the starting points, the control points, and the ending points of the concave curved contours which are included in the vector data with line segments, be straight line contours.

The triangular data generation unit 2 generates a plurality of triangular data with a pivot being as one vertex, in the same manner as in the first embodiment, with respect to the polygons by the analysis on the straight line contours. An example of generated triangular data is shown in FIG. 19.

A configuration type of the curved contours and a method for generating triangular data from the curved contours are the same as in the first embodiment.

The stencil data generation unit 4 reads and rasterizes the triangular data of the straight line contours (FIG. 19) and the triangular data of the curved contours (FIG. 5B) from the triangular data storage unit 3 in the same manner as in the first embodiment. At this time, with respect to the triangles of the straight line contours, all the pixels at the inside of the respective triangles are rasterized, so that pixel values of stencil data corresponding to these pixel positions are bit-inverted.

Figure 19:
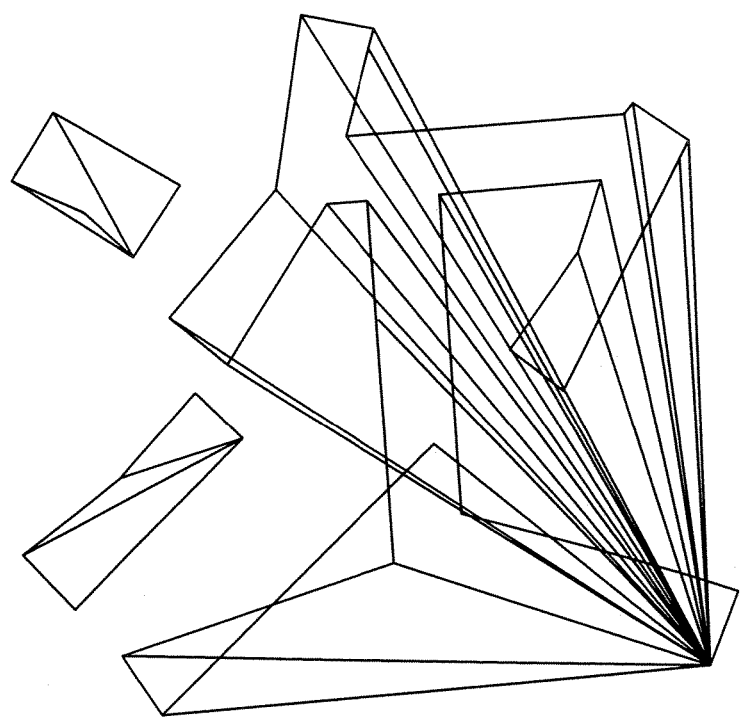
FIG. 19 is a view showing an example of triangular data generated from straight line contours in a second embodiment.
Figure 20:
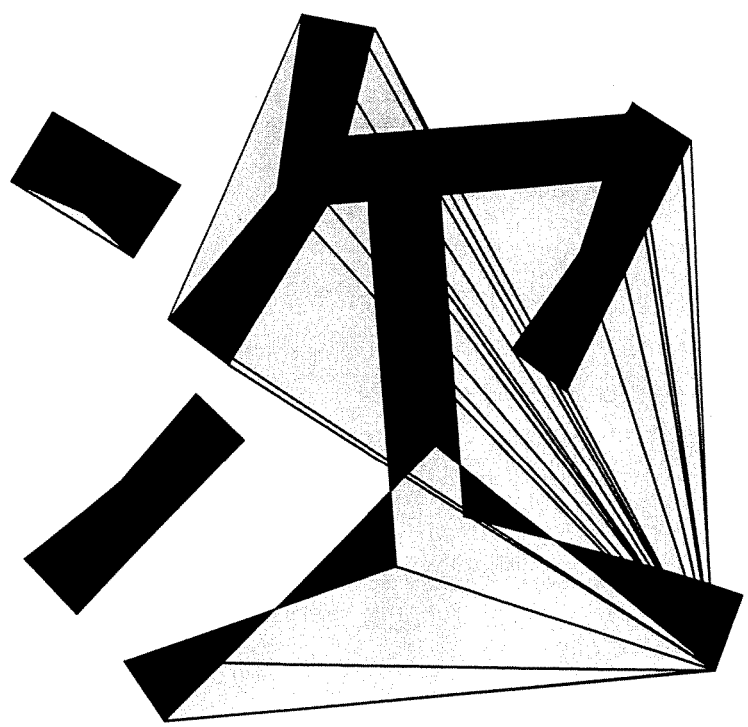
FIG. 20 is a view showing an example of generating triangular stencil data generated from the straight line contours in the second embodiment.

When all the triangles in FIG. 19 are drawn by bit-inversion, stencil data as shown in FIG. 20 is obtained. In FIG. 20, among the pixels which have been bit-inverted once or more, areas whose pixel values are numeric values other than zero are filled with black, and areas whose pixel values are zero are filled with gray.

As shown in FIG. 16A, in the first embodiment, the stencil data generation unit 4 rasterizes only pixels belonging to the convex areas of the curves among the pixels at the inside of the triangles of the curved contours.

Figure 21A:
FIGS. 21A and 21B are views showing examples of generating triangular stencil data expressing curved contours in the second embodiment.

In contrast thereto, in the second embodiment, the stencil data generation unit 4, as shown in FIG. 21A, rasterizes only concave areas of the concave curved contours or only convex areas of the convex curved contours among the pixels at the inside of the triangles of the curved contours, and bit-inverts pixel values of stencil data corresponding to these pixel positions.

Figure 21B:
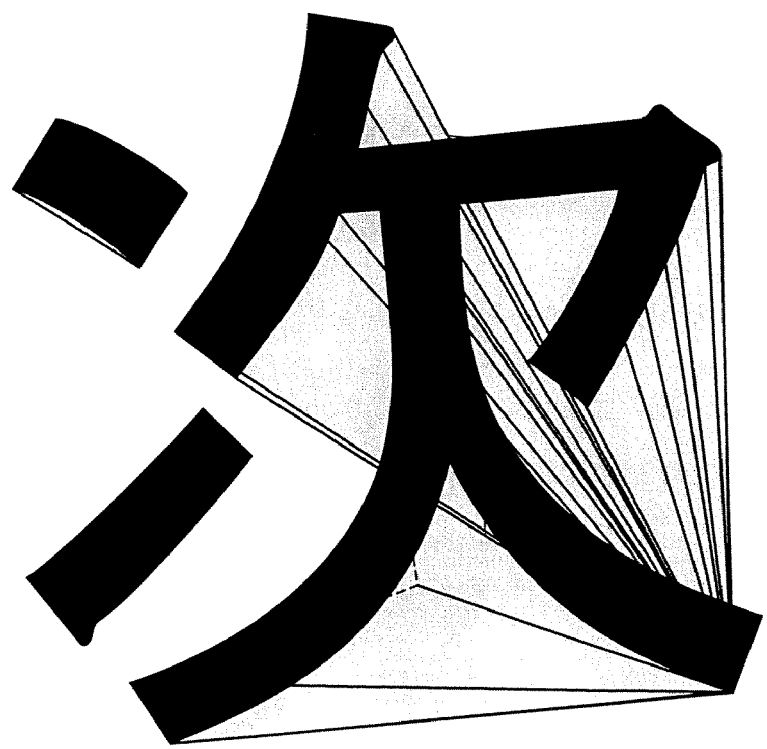

For example, when, in the case where the triangular data of the straight line contours has been already drawn by bit-inversion and the stencil data shown in FIG. 20 has been obtained, pixel values belonging to the concave areas or the convex areas of the curves as shown in FIG. 21A are drawn by bit-inversion, the stencil data is updated as shown in FIG. 21B. As can be seen from FIG. 21B, the pixel values at the inside of the graphic of FIG. 2 provided initially are made to be numeric values other than zero, and pixel values at the outside are made to be zero.

Note that there is no dependence on order in the processes of bit-inversion drawing of the triangular data. In FIGS. 20, 21A and 21B, first, the triangular data of the straight line contours are drawn in a lump, and then, the triangular data of the curved contours are drawn in a lump. However, all the triangles may be drawn in any order.

The procedure of processes of the rasterizing technique by the image processing apparatus according to the second embodiment is substantially the same as the flowchart of the first embodiment shown in FIG. 18.

Accordingly, in accordance with the image processing apparatus of the second embodiment, it is possible to greatly reduce the preprocessing cost in the same manner as in the first embodiment. For this reason, even when the geometrical form of the graphic is dynamically changed, rasterizing can be performed at high speed.

Further, in the second embodiment, the analysis technique on the straight line contours is different from that of the first embodiment, and the same analysis as in the technique shown in FIGS. 5A and 5B is carried out. However, it is clear that subdivision of the curved contours (step S103) and updating of the straight line contours (step S104) are no longer required, and in this point as well, it is possible to greatly reduce the preprocessing cost.

A third embodiment will be described.

Figure 22:
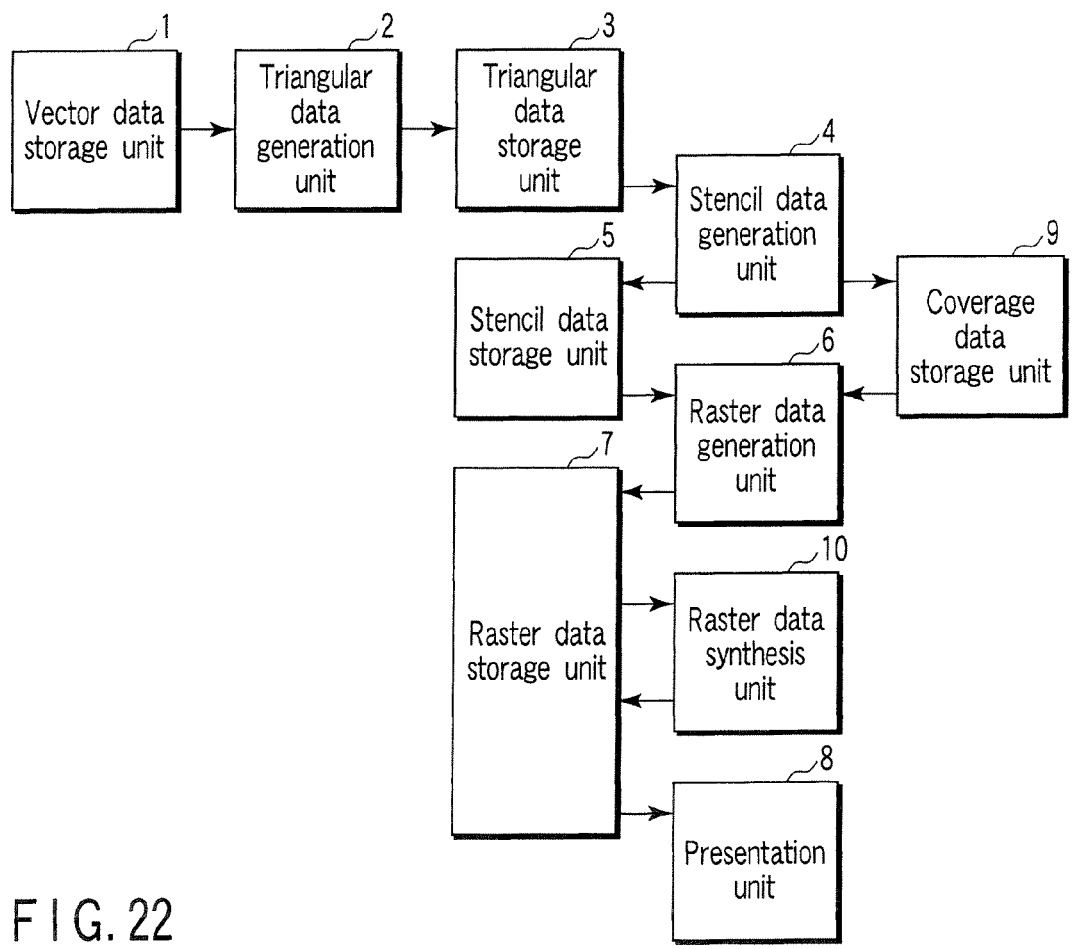
FIG. 22 is a block diagram showing a schematic configuration of a image processing apparatus according to a third embodiment.

As shown in FIG. 22, in a image processing apparatus according to the third embodiment, a coverage data storage unit 9 and a raster data synthesis unit 10 are further provided to the image processing apparatus according to the first and second embodiments.

The coverage data storage unit 9 stores coverage data output from the stencil data generation unit 4.

The coverage data is image data having the same resolution as that finally presented to the presentation unit 8. Numeric values represented by a plurality of bits are assigned to respective pixels of the coverage data, and are initialized to 1 in advance of all drawings every frame.

The stencil data generation unit 4 draws the stencil data by bit-inversion and outputs to the stencil data storage unit 5. At that time, the stencil data generation unit 4 draws an alpha value onto corresponding pixel positions of the coverage data remained in the coverage data storage unit 9.

The stencil data generation unit 4 assigns values less than 1 to alpha values of the pixels positioned near the edge of the graphic among the rasterized pixels, and outputs the alpha values as coverage data to the coverage data storage unit 9.

The raster data generation unit 6 generates raster data with a sub-pixel accuracy with reference to the coverage data stored in the coverage data storage unit 9, and outputs the data to the raster data storage unit 7.

Then, when a pixel whose coverage data is 1 is rasterized, the raster data generation unit 6 assigns color values of pixels rasterized this time with respect to all the sub-pixels included in the pixel.

On the other hand, when pixels whose coverage data are less than 1, i.e., pixels near the edge of the graphic are rasterized, the raster data generation unit 6 assigns the color values of the pixels rasterized this time with respect to some of the sub-pixels included in the pixels, and stores the already assigned color values directly with respect to the remaining sub-pixels. Note that the sub-pixels to which the color values are assigned are selected on the basis of a size of the coverage.

The raster data storage unit 7 stores raster data with a sub-pixel accuracy generated by the raster data generation unit 6, and raster data with a pixel accuracy synthesized by the raster data synthesis unit 10.

The raster data synthesis unit 10 synthesizes the raster data with a sub-pixel accuracy stored in the raster data storage unit 7, and transforms the data into raster data having the same resolution (pixel accuracy) as that finally presented to the presentation unit 8.

In this way, a smoothly rasterized result in which jaggies have been removed can be obtained due to the raster dada with a sub-pixel accuracy being synthesized.

As described above, in the technique in the reference document, alpha blending has been used for anti-aliasing. For this reason, all the graphics objects must be depth-sorted, and rasterized in order of graphic at a deeper position.

However, in accordance with the image processing apparatus of the third embodiment, anti-aliasing can be carried out at high speed because alpha blending at a high processing cost is not used.

A fourth embodiment will be described.

The respective embodiments basically describe examples in which graphics including parameter curves (for example, quadratic Bezier curves) are rasterized. The fourth embodiment shows an example in which even a graphic including cubic Bezier curves can be handled in the same manner as the graphic including parameter curves (for example, quadratic Bezier curves) as described above. Note that, because the processing procedure thereof is the same as that of the first embodiment, illustrations thereof are omitted. Further, descriptions thereof overlapped onto those of the first embodiment are also omitted.

Figure 23:
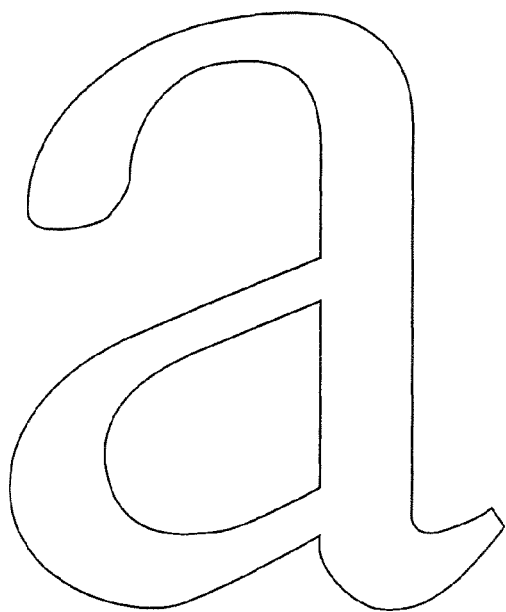
FIG. 23 is a view showing one example of a vector format graphic for explanation of a fourth embodiment.

FIG. 23 is a view showing an example of a graphic including cubic Bezier curves. Suppose that the graphic of FIG. 23 is stored in the vector data storage unit 1 as vector data as shown in FIG. 24.

Figure 24:
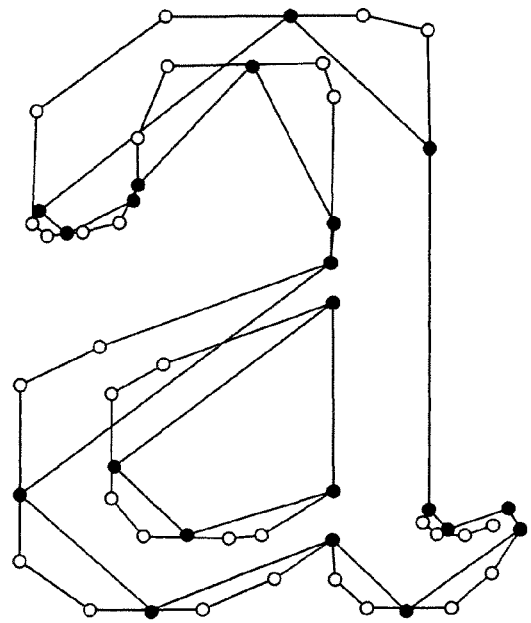
FIG. 24 is a view showing an example of straight line contours and curved contours in the fourth embodiment.

The triangular data generation unit 2 analyzes the vector data shown in FIG. 24, and generates the straight line contours shown in FIG. 25A and the curved contours shown in FIG. 25B in the same manner as in the first embodiment. Here, the end-points of the straight lines or the parameter curves on the graphic are expressed by black points, and the control points of the parameter curves are expressed by white points. In the fourth embodiment, the control points of a parameter curve are two points with respect to the end-points of the parameter curve, and a triangle is formed such that one control point is connected to an end-point positioned diagonally. Note that the raster data with respect to the curved contours is determined by a curve as shown in FIG. 26A. However, this may be determined by a curve having an inflection point as shown in FIG. 26B.

Figure 27:
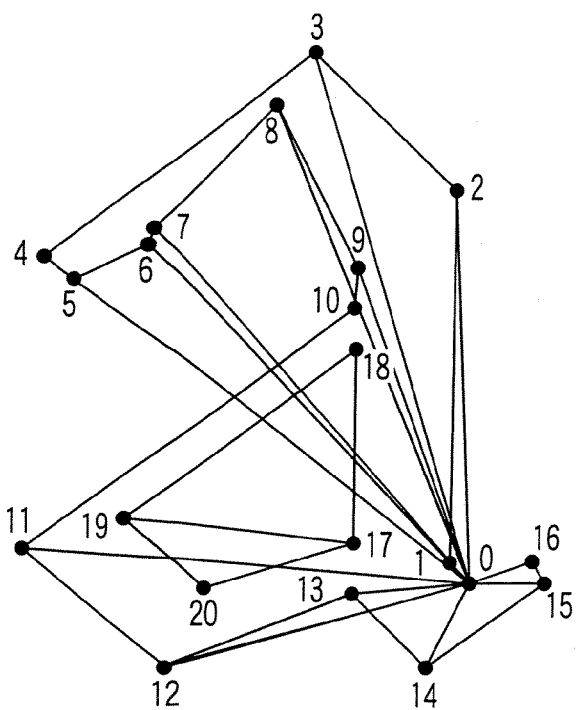
FIG. 27 is a view showing an example of triangular data generated from the straight line contours in the fourth embodiment.

Then, with respect to the straight line contours, in the same manner as in the first embodiment, the triangular data generation unit 2 generates a plurality of triangle with the pivot being as one vertex such that, as shown in FIG. 27, a pivot (0 point in FIG. 27) and all the other vertices in the triangles including the pivot are connected with straight lines, and two vertices coupled to each other become a side of one triangle.

Figure 28:
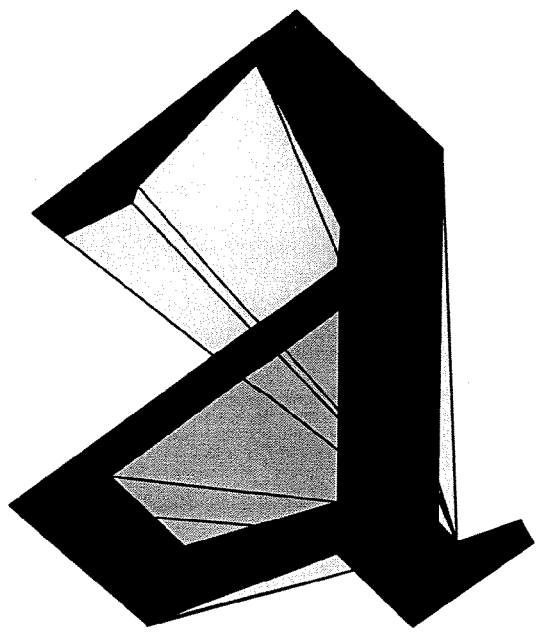
FIG. 28 is a view showing an example of generating triangular stencil data generated from the straight line contours in the fourth embodiment.
Figure 29A:
FIGS. 29A and 29B are views showing examples of generating triangular stencil data generated from the straight line contours in the fourth embodiment.
Figure 29B:
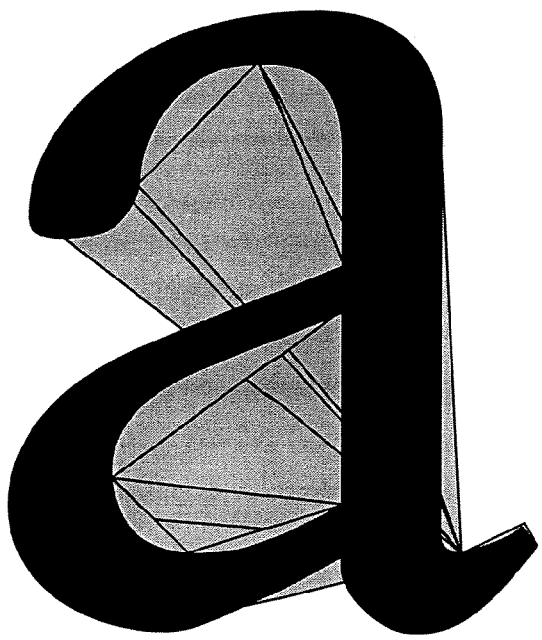
Figure 30A:
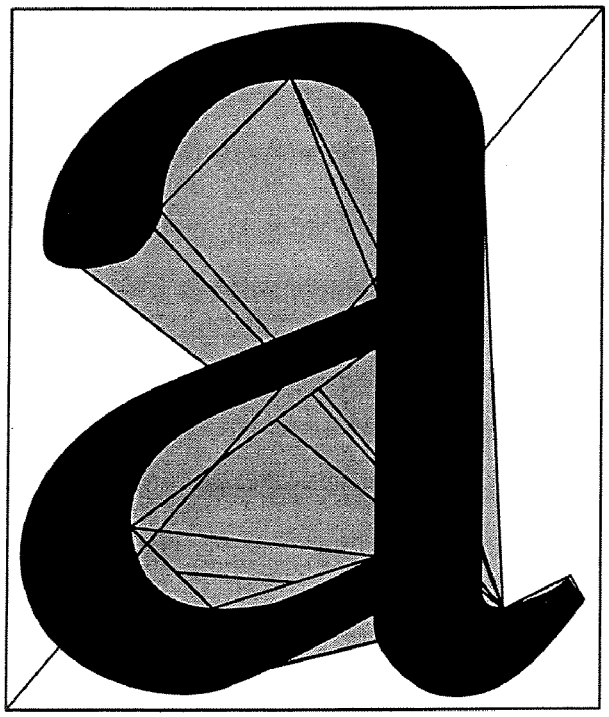
FIGS. 30A and 30B are views showing examples of generating raster data in the fourth embodiment.
Figure 30B:
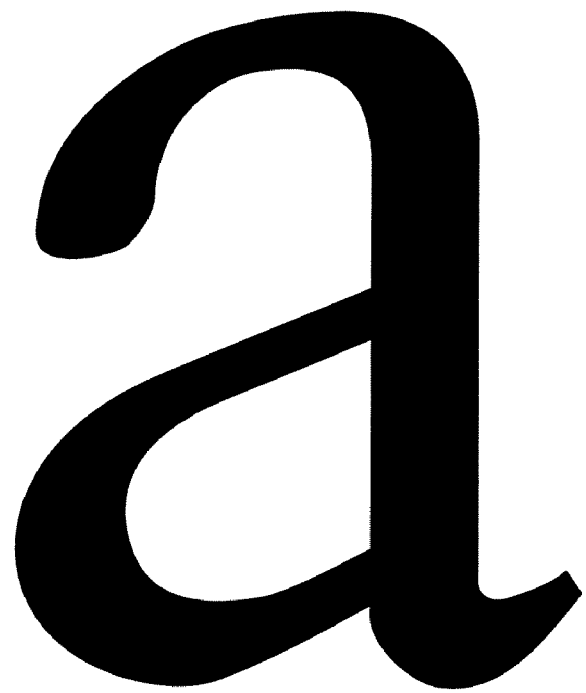

The stencil data generation unit 4 rasterizes the triangular data prepared by the triangular data generation unit 2 in the same manner as in the first embodiment. As a consequence, rasterized stencil data shown in FIG. 28 can be obtained. Finally, in the same manner as in the first embodiment, the stencil data generation unit 4 generates stencil data as shown in FIG. 29B from the stencil data obtained from the triangular data by the straight line contours (FIG. 28) and the stencil data obtained from the triangular data by the curved contours (FIG. 29A). Then, all the pixels at the inside of the two triangles covering the entire graphic as shown in FIG. 30A are finally rasterized. However, pixels which will be actually written into the raster data storage unit 7 among these pixels are limited to an area at which pixel values of corresponding stencil data are numeric values other than zero (the area filled with black in FIG. 30A). As a result, raster data as shown in FIG. 30B is written into the raster data storage unit 7. Note that, because the detailed processes in this case are the same as those in the first embodiment, descriptions thereof are omitted.

As described above, the present embodiment provides a new rasterizing technique in which the preprocessing cost is greatly reduced. As a result, even when a geometrical form of a graphic is dynamically changed, rasterizing can be carried out at high speed.

Moreover, the present embodiment provides a new anti-aliasing technique which does not require alpha blending. As a consequence, depth-sorting whose processing cost is high is no longer required, and it is possible to apply anti-aliasing at high speed.

For example, the above-described embodiments have described the cases in which raster format graphic data is generated from vector format graphic data with respect to a character. However, it goes without saying that the present invention can be applied to a case, when another graphic, for example, map data is provided in a vector format, raster format graphic data is generated from the map data.

According to the present invention, rasterizing can be performed at high speed even when a geometrical form of a graphic is dynamically changed. Further, it is possible to apply anti-aliasing at high speed without using alpha blending with a high processing cost.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus, comprising:
    a first data generation unit which generates triangular data by analyzing straight line contours and curved contours with respect to vector format graphic data and making the straight line contours and the curved contours triangles;
    a second data generation unit which generates stencil data from the triangular data;
    a third data generation unit which generates raster format graphic data with reference to the stencil data;
    a first storage unit which stores the vector format graphic data;
    a second storage unit which stores the triangular data generated by the first data generation unit;
    a third storage unit which stores the stencil data generated by the second data generation unit; and
    a fourth storage unit which stores the raster format graphic data generated by the third data generation unit, wherein
    the first data generation unit generates at least one polygon by analyzing the straight line contours of the vector format graphic data, and generates a plurality of triangles with respect to each polygon in such a manner that one vertex of a polygon is made to be a common vertex of the plurality of triangles, the common vertex and all other vertices are connected with straight lines, and two vertices coupled to each other become a side of one triangle, and
    the second data generation unit generates the stencil data by bit-inverting pixels at the inside of said plurality of triangles stored in the third storage unit, and by bit-inverting only pixels at the inside of the curved contours triangles to which concave or convex areas of curves belong, where said areas are generated on the basis of the curved contours and stored in the third storage unit.

2. The apparatus according to claim 1, further comprising a presentation unit which presents the raster format graphic data.

3. The apparatus according to claim 1, wherein curves defined by the curved contours are parameter curves.

4. The apparatus according to claim 1, wherein the second data generation unit assigns values less than 1 to alpha values of pixels positioned near an edge of a graphic among rasterized pixels.

5. The apparatus according to claim 4, further comprising a fifth storage unit which stores, as coverage data, alpha values of pixels output from the second data generation unit.

6. The apparatus according to claim 5, further comprising a raster data synthesis unit which synthesizes the raster data on the basis of the coverage data stored in the fifth storage unit.

7. An image processing method of an image processing device, the method comprising:

analyzing, by the image processing device, straight line contours and curved contours with respect to vector format graphic data, and generating triangular data by making the straight line contours and the curved contours triangles;

generating, by the image processing device, stencil data from the triangular data;

generating, by the image processing device, raster format graphic data with reference to the stencil data;

storing in a first storage unit the vector format graphic data;

storing in a second storage unit the generated triangular data;

storing in a third storage unit the generated stencil data; and storing in a fourth storage unit the generated raster format graphic data, wherein the generating the triangular data includes generating at least one polygon by analyzing the straight line contours of the vector format graphic data, and generating a plurality of triangles with respect to each polygon in such a manner that one vertex of a polygon is made to be a common vertex of the plurality of triangles, the common vertex and all other vertices are connected with straight lines, and two vertices coupled to each other become a side of one triangle, and the generating the stencil data includes generating the stencil data by bit-inverting pixels at the insides of said plurality of triangles stored in the third storage unit, and by bit-inverting only pixels at the inside of the curved contours triangles to which concave or convex areas of curves belong, where said areas are generated on the basis of the curved contours and stored in the third storage unit.

8. A computer readable storage medium having embedded therein computer executable instructions, wherein the instructions, when executed by a processor, cause the processor to perform a method comprising:

analyzing straight line contours and curved contours with respect to vector format graphic data, and generating triangular data by making the straight line contours and the curved contours be triangles;

generating stencil data from the triangular data;

generating raster format graphic data with reference to the stencil data;

storing in a first storage unit the vector format graphic data;

storing in a second storage unit the generated triangular data;

storing in a third storage unit the generated stencil data; and storing in a fourth storage unit the generated raster format graphic data, wherein the generating the triangular data includes generating at least one polygon by analyzing the straight line contours of the vector format graphic data, and generating a plurality of triangles with respect to each polygon in such a manner that one vertex of a polygon is made to be a common vertex of the plurality of triangles, the common vertex and all other vertices are connected with straight lines, and two vertices coupled to each other become a side of one triangle, and the generating the stencil data includes generating the stencil data by bit-inverting pixels at the insides of said plurality of triangles stored in the third storage unit, and by bit-inverting only pixels at the inside of the curved contours triangles to which concave or convex areas of curves belong, where said areas are generated on the basis of the curved contours and stored in the third storage unit.

* * * * *